United States Patent [19]

Mauldin

[11] 4,378,958

[45] Apr. 5, 1983

[54] VAULT CADDY

[76] Inventor: Herbert N. Mauldin, Rt. 7, Viewmont, Dr., Greenville, S.C. 29609

[21] Appl. No.: 194,142

[22] Filed: Oct. 6, 1980

Related U.S. Application Data

[63] Continuation of Ser. No. 881,709, Feb. 27, 1978, abandoned.

[51] Int. Cl.³ .............................................. B60P 3/28
[52] U.S. Cl. ..................................................... 414/461
[58] Field of Search .............. 414/460, 461; 180/6.48; 254/136

[56] References Cited

U.S. PATENT DOCUMENTS

| Re. 25,145 | 3/1962 | Baudhuin | 414/461 |
|---|---|---|---|
| 2,028,442 | 1/1936 | Dormer | 254/136 X |
| 2,711,077 | 6/1955 | Adams | 180/6.48 X |
| 3,234,856 | 2/1966 | Martin | 180/6.48 X |
| 3,272,362 | 9/1966 | Lamer et al. | 414/461 |
| 3,390,795 | 7/1968 | Mannix | 414/461 |
| 3,479,010 | 11/1969 | Harmon | 254/4 B |
| 3,808,813 | 5/1974 | Spinks | 180/6.48 X |
| 4,074,782 | 2/1978 | Bauer | 180/6.48 |

FOREIGN PATENT DOCUMENTS 458270 7/1949 Canada ............................... 254/136

*Primary Examiner*—James L. Rowland

[57] ABSTRACT

A self-propelled vault carrying vehicle having a pair of spaced opposed side frames for straddling a vault and a bridge frame extending between upper portions of the side frames wherein a separate drive is provided for a pair of driven wheels on each side of the frame and control for controlling the operation of the driven wheels independently of one another to provide for highly effective tractive steering and a high degree of maneuverability. A powered lift is carried on the bridge frame for raising and lowering the vault with the ends and bottom of the vehicle frame being open to provide unobstructed vertical movement of the vault with respect to the frame.

2 Claims, 3 Drawing Figures

VAULT CADDY

This is a continuation, of application Ser. No. 881,709, filed Feb. 27, 1978, now abandoned.

BACKGROUND OF THE INVENTION

The increased use of burial vaults of great weight has created problems in transporting and positioning these vaults for burial. Motorized carrier vehicles have generally been known heretofore such as shown in U.S. Pat. No. 3,479,010, but are impractical for transporting and positioning a heavy vault like object. Burial vaults typically weigh upwards to one and a half tons and thus far surpass the capacity of any known prior caddy vehicle for transporting the vault as well as any self-propelled vehicle having an adequate lift and letdown mechanism. Another shortcoming of prior known self-propelled vehicles is that they are awkward to handle and provide inadequate traction and steering for transporting such large objects as vaults.

Accordingly, an important object of the present invention is to provide a self-propelled vehicle for transporting a heavy vault and the like having a lift for positioning the vault vertically.

Another important object of the present invention is the provision of a self-propelled vehicle for transporting and positioning a heavy vault having improved traction and steering affording a high degree of maneuverability.

Still another important object of the present invention is the provision of a self-propelled vehicle having an improved frame for transporting and positioning a heavy vault having opposed sides for straddling the vault and open ends and bottom providing unobstructed vertical movement of the vault without sacrificing the structural integrity of the vehicle frame.

Yet another important object of the present invention is the provision of a self-propelled vehicle for transporting a heavy vault and the like objects having independent drive and control of both wheels on each side of the vehicle frame affording a simplified and highly maneuverable steering of the vehicle.

SUMMARY OF THE INVENTION

It has been found that transportation and vertical positioning of a heavy burial vault can be had in accordance with the present invention by providing a self-propelled vehicle including a frame having a pair of spaced opposed vertical side frame members and a bridging frame integrally connecting the side frame members adjacent an upper portion thereof. A lift is carried by the bridging frame for vertical positioning of the vault and the frame is open at its ends and bottom intermediate the side frames providing unobstructed vertical movement of the vault with respect to the frame. At least one driven wheel is carried by the frame adjacent each of its sides and a drive means includes a pair of separate powered drive motors for driving the wheels on opposite sides independently of one another. Power means is provided for operating the drive means and a control means is provided for controlling the operation of drive motors independent of one another whereby the vehicle may be steered by intermittently controlling the traction of the separate drives.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

The drawings illustrate a self-propelled vault caddy vehicle, designated generally as A, for transporting and vertically positioning a vault object and the like including a frame B having a pair of side frame members carried in spaced opposed relation and a bridging frame member integrally connecting the side frame members adjacent an upper portion thereof. A lift means C is carried by the bridging frame member for raising and lowering the vault and the frame is open at the ends and bottom thereof intermediate the side frame members enabling the side frame members to straddle the vault and provide vertically unobstructed raising and lowering of the vault with respect to the frame. At least one driven wheel is carried by the frame on each side thereof and a drive means D includes a first power drive, for driving the driven wheel adjacent one of the side frame members and a second power drive for driving the driven wheel adjacent the other side frame member. Power means E is provided for operating the drive means D and a control means F is provided for controlling the operation of the first and second power drives independently of one another to provide tractive stearing for the vehicle and includes means for controlling the operation of the lift means C.

Figure 1:
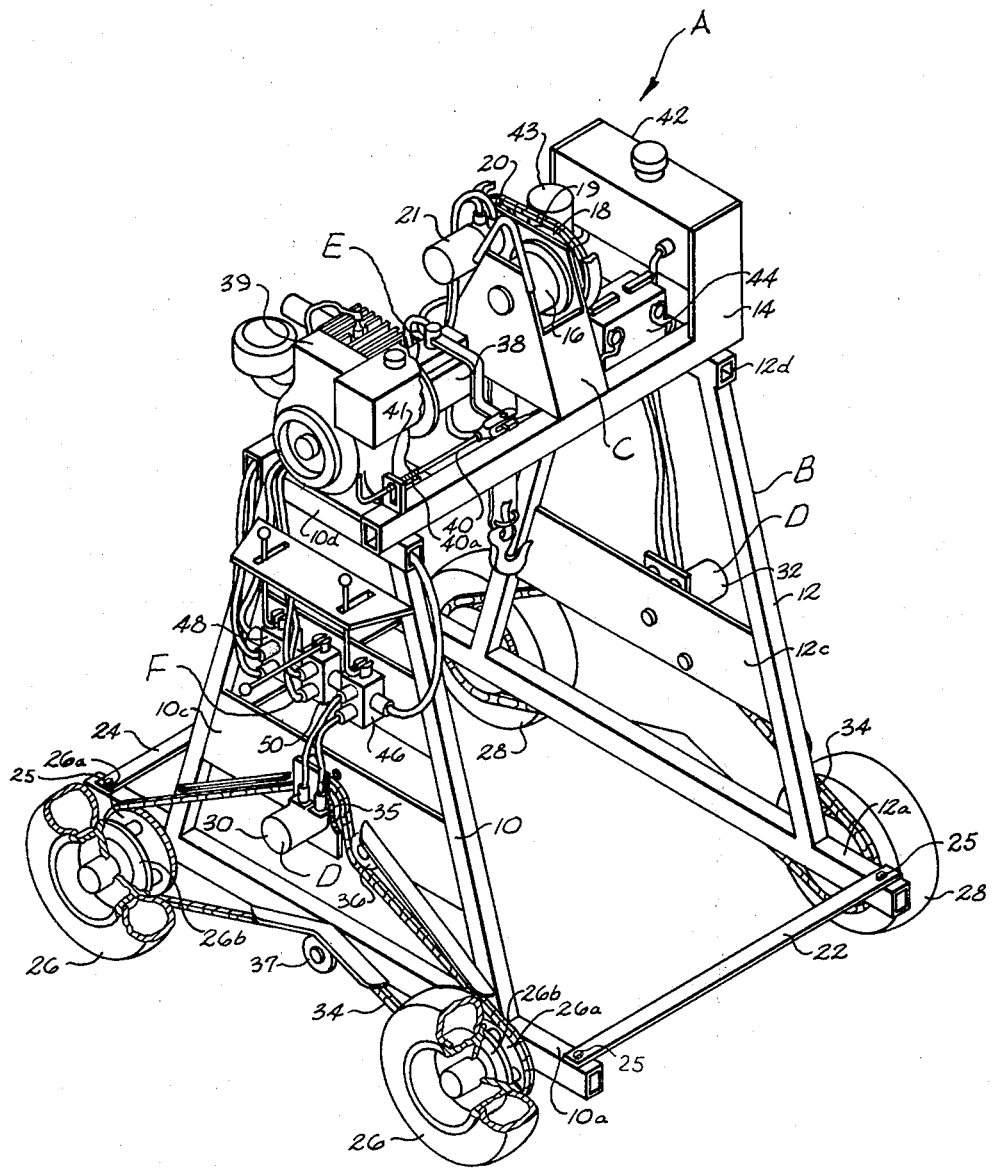
FIG. 1 is a perspective view illustrating a self-propelled vehicle for transporting a vault and for positioning the same vertically according to the invention.
Figure 2:
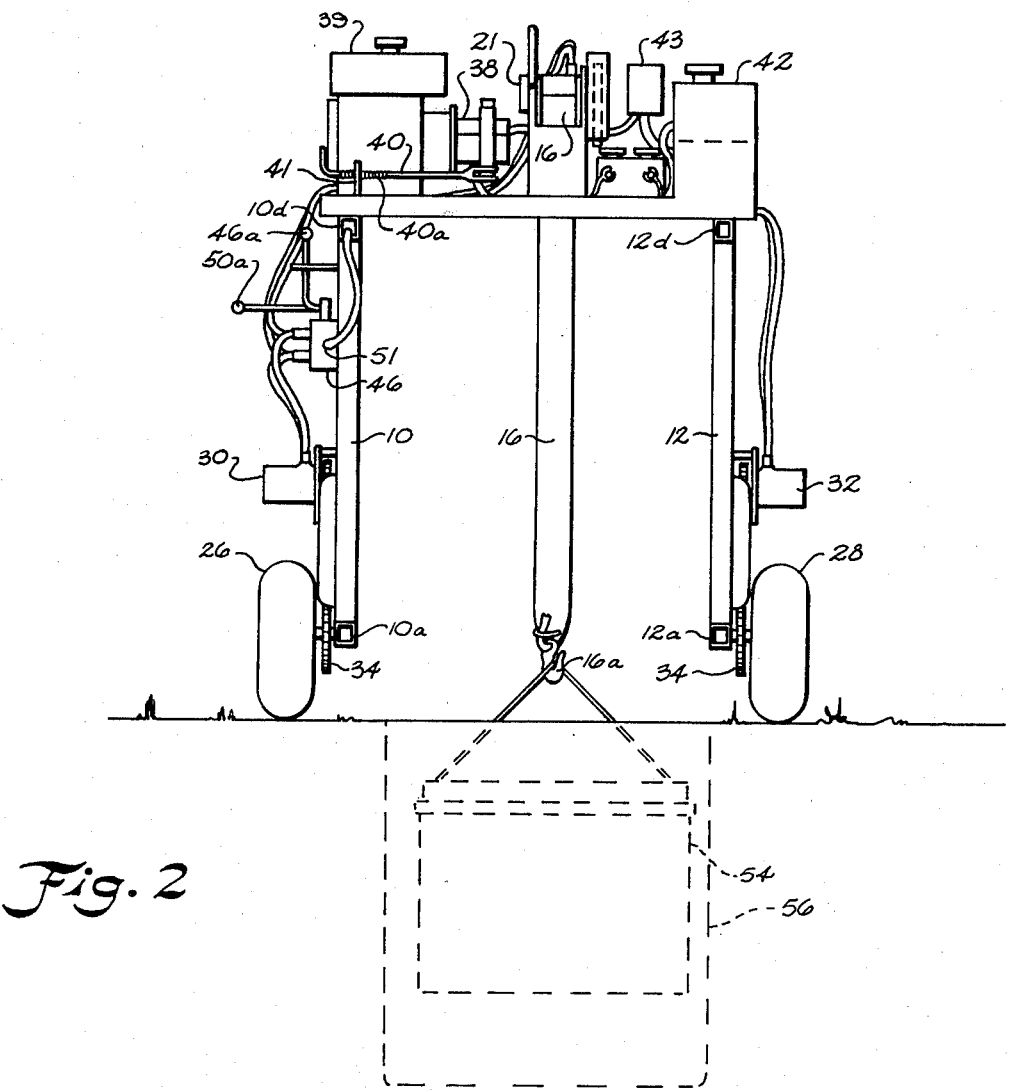
FIG. 2 is a front elevation illustrating a self-propelled vault carrying vehicle constructed in accordance with the invention wherein vertical positioning of the vault is illustrated.
Figure 3:
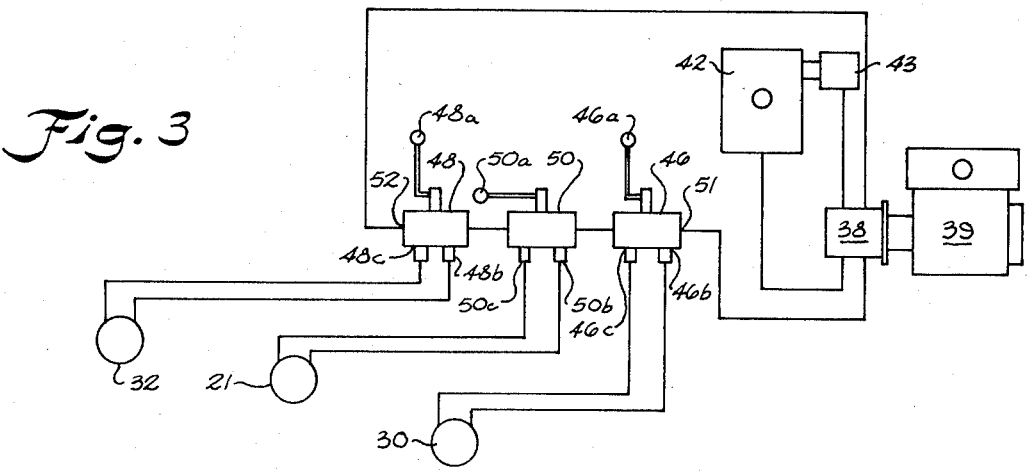
FIG. 3 is a schematic diagram illustrating a hydraulic circuit for controlling and driving a self-propelled vault caddy vehicle according to the invention.

Referring now in more detail to FIG. 1, the frame B of the vehicle includes side frame members 10 and 12 carried in spaced opposed relation and bridging frame member 14 integrally connecting side frames 10 and 12 adjacent an upper portion thereof. The frame members may be made integral by any suitable means such as by welding. The side frame includes base rails 10a and 12a, middle flange members 10c and 12c, and top rails, 10d and 12d.

The lift mechanism C includes a lift strap 16 and hook 16a wound upon a spindle having a drive sprocket 18 journaled on a free end thereof. Sprocket 18 is driven by a chain 19 which, in turn, is driven by a sprocket 20 carried on the output shaft of a hydraulic lift motor 21.

It will be noted that the frame B is open at the ends and bottom thereof intermediate side frame members 10 and 12 enabling the vault to be straddled by the frame affording vertically unobstructed vertical movement of the vault with respect to the frame with the ends of the vault extended past the frame ends. Removable load support members 22 and 24 are longitudinally spaced and are transversely extending between the side frame members 10 and 12 adjacent the front and rear thereof for support of the vault during transportation. For lifting operations, the removable support members are removed and for this purpose pins or bolts 25, or other attachment means are provided adjacent the ends of the support members receivable in cooperating slots formed in an upper surface of base rails 10a and 12a.

As illustrated, a pair of driven wheels 26 are carried by the frame B adjacent the side 10 and a second pair of driven wheels 28 are carried by frame B adjacent the side 12. While at least one of the wheels 26 and 28 of each pair need be driven, it has been found advantageous to the transporting and maneuvering of very heavy type burial vaults to positively drive all four of the wheels 26 and 28. Drive means D for driving the wheels includes a first hydraulically powered drive motor 30 for driving the set of wheels 26 and a second hydraulically powered drive motor 32 for driving the set of wheels 28. Motors 30 and 32 are fixed to side frame flanges 10c and 12c by suitable brackets. The drive means further includes a drive chain 34 which meshes with drive sprockets 26a made integral with a wheel plate 26b of each wheel 26 and with a drive sprocket 35 carried on the output shaft of the drive motor 30. Idler sprockets 36 and 37 are utilized as required for maintaining proper tensioning of the drive chain 34. An identical drive transmission is utilized in connection with the set of wheels 28 and drive motor 32 for driving each wheel 28 on the opposite side of frame B. Hydraulic drive motors 30 and 32 and lift motor 21 may be of the gear pump type, or a particularly suitable pump is the MAC series of pump motors manufactured by Ross Gear, a Division of TRW.

Power means E for operating the drive means D as well as the hydraulic lift motor 21 includes a variable displacement hydraulic drive pump 38 having a variable speed control in the form of lever 40 which varies the displacement of the pump and hence the speed at which it drives the motors 31, 30 and 32. The master pump 38 is, in turn, driven by a small internal combustion engine 39 which burns a suitable fuel such as gasoline by coupling to the output shaft thereof. Control lever 40 is provided with a knurl or notches 40a which cooperate with a keyshaped slot in bracket 41 to lock the lever in a desired speed position. The master pump 38 may be any suitable variable displacement type pump such as, for example, a series 15 hydrostatic transmission manufactured by Sund Strand Hydro-Transmission, A Division of Sund Strand Corporation of Ames, Iowa. Such a pump typically includes a cooling circuit in which a portion of the hydraulic fluid is continuously circulated through a reservoir 42 and a filter 43 for cooling and cleaning and then circulated back to the pump 38. This dissipates much of the heat generated by the hydrostatic transmission and maintains the temperature at a continuous operating level. However, other suitable variable displacement pumps may also be utilized as master pumps. An electrical battery 44 provides electrical starting of the combustion engine 39.

Control means F includes a series bank of conventional two-way hydraulic valves 46, 48 and 50 for controlling drive motors 30, drive motors 32, and lift motor 21, respectively. Fluid from the master pump 38 is delivered to inlet 51 and returns to the pump from outlet 52 of the bank of valves. Each valve has a pair of ports b and c through which fluid is delivered by means of fluid lines for forward or reverse operation in the case of drive motors 30 and 32 and for up or down operation in the case of lift motor 21. Each valve has a neutral position in which the fluid is prevented from flowing in the circuit it controls.

Each drive control valve 46 and 48 has a manually operated lever 46a and 48a with a neutral position and a forward and reverse position. Lift control valve 50 includes a manually operated lever 50a which has a neutral position and an up and down position for operating the lift means C.

In operation, as levers 46a and 48a move to the forward position, hydraulic fluid from the master pump 38 is supplied to the hydraulic motors 30 and 32 driving their respective sprocket drives coupled to the driven wheels 26 and 28 by chain 34 to propel the vehicle A along the ground. The same is true for the reverse operation of the control levers 46a and 48a which causes fluid to be delivered to the opposite port of drive motors causing them to rotate the wheels in a reverse direction. It is important to note that independent control of the driven wheels on each side of the vehicle is provided by the separate control valves 46 and 48. This affords very effective tractive steering of the vehicle as required for a high degree of maneuverability in positioning the vault 54 above and over a grave opening 56. For example, with the control lever 48a in its neutral position, the hydraulic circuit of the hydraulic motor 32 is held static and the motor and wheels are, in effect, locked. In this condition, the opposite wheels 26 may be driven and turn the vehicle in a circle about the locked wheels. Likewise, if one set of wheels is put in reverse drive with the opposite set of wheels put in forward drive, the vehicle will essentially turn within its own circle. Thus, by moving levers 46a and 48a in a wide variety of combinations, a wide range of tractive steering and maneuverability is afforded.

In a like manner, the control valve 50 controls operation of the lift motor 21 by raising and lowering the strap 16 which is suitably attached to the vault 54. The neutral position of the valve locks the vault at any desired position while the up and down positions raise and lower the vault to position it vertically.

It will be recognized that during forward or reverse drive of the vehicle or during lifting of the vault that the control lever 40 may be set in any one of the notches 40a to control the speed at which the various drive pumps are operated affording a wide range of drive speeds, for transporting and lifting operations. During solely transportation operations it will be an expedient to support the vault upon the removable load support members 22 and 24 to stabilize the vault while taking the load off of the lift means C. For example, in use, the caddy vehicle may initially be utilized to raise the vault from a storage location and, with the subsequent placement of load supports 22 and 24, lower the vault upon the supports. Thereafter, the caddy vehicle is typically utilized to transport the vault up a ramp onto the bed of a truck whereupon the entire assembly may be strapped down for transportation to the grave site. Upon arrival, the caddy vehicle will transport the vault down the ramp from the truck bed and over ground to the grave site location. At the grave site, the vehicle will be maneuvered over the grave with the vault being rested on top of the ground or lowered into the grave.

Thus it can be seen that an advantageous construction can be had for a self-propelled vehicle for transporting and vertically positioning a vault according to the invention. The four-wheel drive affords adequate traction for transporting the vault anywhere including up and down steep ramps and the independent control of the wheels on each side of the vehicle frame affords highly effective tractive steering and maneuverability for the transportation and positioning of the vault. The vehicle frame is lightweight yet affords structural integrity for handling even a one and a half ton vault.

While a preferred embodiment of the invention has been described using specific terms, such description is for illustrative purposes only, and it is to be understood that changes and variations may be made without departing from the spirit or scope of the following claims.

What is claimed is:

1. A self-propelled vault carrying vehicle for transporting and vertically positioning a vault object and the like comprising:

a frame including a pair of said frame members carried in spaced opposed relation, and a bridging frame member integrally connecting said side frame members adjacent an upper portion thereof;

said side frame members converging upwardly to said bridging member;

lift means carried by said bridging member for raising and lowering said object;

said frame being open at the ends and bottom thereof intermediate said side frame members enabling said side frame members to straddle said object and provide vertically unobstructed raising and lowering of said object with respect to said frame;

a pair of driven wheels carried by said frame adjacent each of said side frame members;

drive means including a first hydraulic powered drive for driving the driven wheels adjacent one of said side frame members and a second hydraulic powered drive for driving the driven wheels adjacent the other of said side frame members affording positive drive traction for each wheel of each said pair; and third hydraulic powered drive for driving said lift means;

hydraulic power supply means for operating said first, second and third hydraulic powered drives;

control means carried by said frame disposed for operation by an operator standing on the ground including a separate control for controlling and operation of said first and second powered drives separately and independently of one another to provide a high degree of tractive steering of said vehicle, and including a separate control for controlling operation of said lift means;

said control means including separate hydraulic control valves connected to respective ones of said first, second, and third hydraulic powered drives; said control valves being connected in series with said hydraulic power supply means providing a live hydraulic circuit by which hydraulic powered drives are simultaneously energized affording a highly responsive control of the movement of said vehicle and said vault object; and longitudinally spaced removable load support members carried transversely extending between said side frame members adjacent the front and rear thereof being affixed as a integral structure to said frame for stably supporting said object during transportation and being removable affording said unobstructed vertical movement.

2. The apparatus of claim 1 wherein said power means includes a variable speed control for controlling the speed at which said drive means operates.

* * * * *